United States Patent
Hattori et al.

(10) Patent No.: US 6,449,064 B1
(45) Date of Patent: Sep. 10, 2002

(54) METHOD AND APPARATUS FOR IMAGE FORMATION THAT CAN HANDLE SIMULTANEOUSLY INPUT DATA WITHOUT CAUSING A DELAY

(75) Inventors: Yasuhiro Hattori, Yokohama; Norio Michiie, Tokyo, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/247,589

(22) Filed: Feb. 10, 1999

(30) Foreign Application Priority Data

Feb. 10, 1998 (JP) .......................................... 10-028955

(51) Int. Cl.⁷ ................................................ H04N 1/00
(52) U.S. Cl. ...................... 358/403; 358/444; 358/1.16; 711/162; 711/168; 711/157
(58) Field of Search .................... 358/403, 1.16, 358/523, 401, 444, 1.17, 404; 382/305; 710/74, 23, 22, 52; 712/225; 711/150–151, 5, 162, 168, 157; 345/540, 530

(56) References Cited

U.S. PATENT DOCUMENTS

| 4,262,280 A | * | 4/1981 | Kochert |
| 4,563,706 A | * | 1/1986 | Nagashima |
| 4,564,864 A | * | 1/1986 | Maeshima |
| 5,223,894 A | * | 6/1993 | Ito |
| 5,287,485 A | * | 2/1994 | Umina et al. |
| 5,499,370 A | * | 3/1996 | Hosaka et al. |
| 5,539,533 A | * | 7/1996 | Kato |
| 5,642,208 A | * | 6/1997 | Takahashi et al. |
| 5,712,714 A | * | 1/1998 | Sasahara |
| 5,878,240 A | * | 3/1999 | Tomko |
| 6,031,638 A | * | 2/2000 | Rao et al. |

FOREIGN PATENT DOCUMENTS

| EP | 0518619 | * | 6/1992 |
| JP | 406318172 | * | 11/1994 |

\* cited by examiner

*Primary Examiner*—Edward Coles
*Assistant Examiner*—Tia A. Carter
(74) *Attorney, Agent, or Firm*—Oblon, Spivak, McClelland, Maier & Neustadt, P.C.

(57) ABSTRACT

An image forming apparatus includes a plurality of memory devices, each including at least one image memory which stores image data. A controller controls input and output operations for the image data relative to the at least one image memory. An image reading device generates image data by scanning and reading an original document. At least one data input device inputs image data generated by an external source. A plurality of input paths transmit the image data generated by the image reading device and the image data input by the at least one data input device. An image memory switching device connects the plurality of input paths to the plurality of memory devices, receives the image data generated by the image reading device and the image data input by the at least one data input device, and switches the plurality of memory devices to transmit consecutive image data, which is consecutively sent through one of the plurality of input paths, to a same memory device among the plurality of memory devices when the image memory switching device receives the image data and the image data through the plurality of input paths.

10 Claims, 9 Drawing Sheets

BACKGROUND ART

METHOD AND APPARATUS FOR IMAGE FORMATION THAT CAN HANDLE SIMULTANEOUSLY INPUT DATA WITHOUT CAUSING A DELAY

BACKGROUND OF THE INVENTION

1. Field of the Invention

The present invention relates to a digital type image forming apparatus, and more particularly to a digital type image forming apparatus, such as a digital copying machine, a facsimile machine, and so forth, which is capable of handling simultaneously input data without causing a delay.

2. Discussion of the Background

In general, an image memory for storing image data has been an important component of a digital type image forming apparatus, such as a digital copying machine, a facsimile machine, and so forth. For example, a digital copying machine which generates image data by reading an original document can store the image data in an image memory so as to be able to manipulate such image data stored therein, using various image editing functions at a later time. The image editing functions of the digital copying machine includes an electronic sort function, a combining function, and the like. The electronic sort function changes a sequence of images based on the image data stored in the image memory and outputs the images in a changed sequence. The combining function combines a plurality of images stored in the image memory into one image and outputs the combined image.

In order to sufficiently perform these image editing functions, the digital copying machine is required to have an image memory which is capable of storing a large amount of image data and processing the image data at a relatively high speed. To cope with these requirements, some digital copying machines use two memory units.

Typically, a first memory unit uses a DRAM (Dynamic Random Access Memory) that enables a relatively high speed read/write access so that read/write operations can be performed in approximate synchronism with a relatively high input/output data rate of the image data. Also, a second memory unit typically uses a HDD (Hard Disk Drive) that is capable of storing a large amount of data so that various image editing functions, including the electronic sort and combining functions, can be performed without causing a problem of insufficient memory capacity.

On the other hand, the digital copying machine is integrated with various functions, such as a printing function for printing an image based on the image data which is output from an external device. Such an integrated digital copying machine which is capable of performing both printing and copying functions includes separate data paths for the image data generated by a copying operation and for the image data received from an external source for a printing operation.

Figure 9:
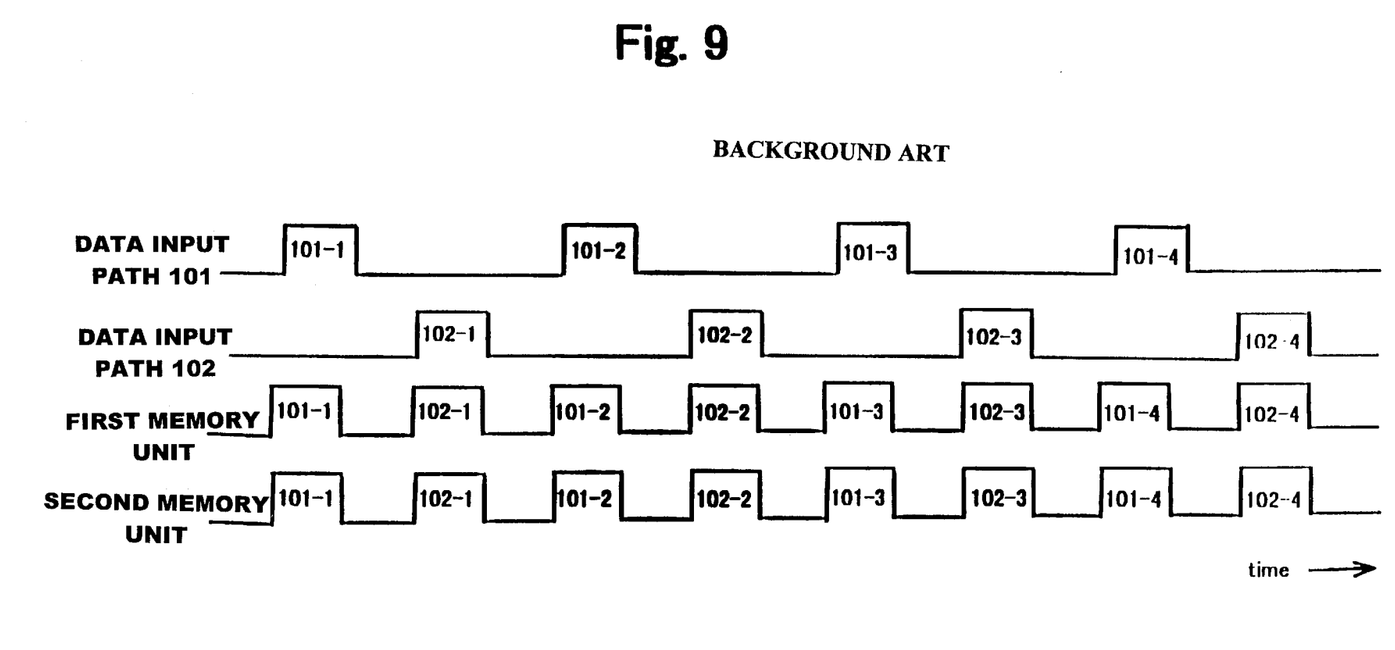
FIG. 9 is a timing chart showing an operation of storing a plurality of image data, each of which is generated by separate functions, in image memories in a background art.

When such an integrated digital copying machine activates both copying and printing operations at the same time, both operations generate image data and transmit the image data to the respective data paths at the same time. In this case, however, in one of these two operations the timing of storing the image data into the image memory is delayed since the memory only allows one access at a time. As a result, and as shown in FIG. 9, the image data of the copying and printing operations will be stored in first and second memory units in an alternate sequence. FIG. 9 shows a time chart for explaining an operation in a background digital copying machine for loading image data for copying and printing operations into first and second memory units, using two data input paths 101 and 102.

Therefore, the background digital type image forming apparatus does not allow simultaneous memory accesses to an image memory thereof for input and/or output by more than one resource of image data.

SUMMARY OF THE INVENTION

In light of the above noted and other problems, an object of the present invention is to provide a novel method and apparatus for forming an image, which is capable of handling simultaneously input data without causing a delay.

These and other objects are achieved by a novel image forming apparatus of the present invention which includes a plurality of memory devices, each including at least one image memory which stores image data. A controller controls input and output operations for the image data relative to the at least one image memory. An image reading device generates the image data by scanning and reading an original document. At least one data input device inputs image data generated by an external source. A plurality of input paths transmit the image data generated by the image reading device and the image data input by the at least one data input device. An image memory switching device connects the plurality of input paths to the plurality of memory devices, receives the image data generated by the image reading device and the image data input by the at least one data input device, and switches the plurality of memory devices to transmit consecutive image data, which is consecutively sent through one of the plurality of input paths, to a same memory device among the plurality of memory devices when the image memory switching device receives the image data and the image data through the plurality of input paths.

The image memory switching device switches among the plurality of memory devices to transmit consecutive image data generated by a same function to a same memory device among the plurality of memory devices when the same memory device among the plurality of memory devices stores the image data which is generated by the same function.

The image forming apparatus may further include an image printing device which prints an image on printing paper based on the image data stored in the image memory according to an electrophotographic process.

A novel method for forming an image according to the present invention includes the steps of transferring the image data generated from a reading device to an image memory switching device, transferring the image data generated from an external function to the image memory switching device, storing the image data in one memory device, switching among the plurality of memory devices, storing the image data in the memory device switched among the plurality of memory devices, and outputting the image data or different image data stored in an image memory in one of the plurality of memory devices to a recording device.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DESCRIPTION OF THE PREFERRED EMBODIMENTS

An embodiment of the present invention is described in detail referring to the drawings, wherein like reference numerals indicate identical or corresponding parts throughout the several views.

Figure 1:
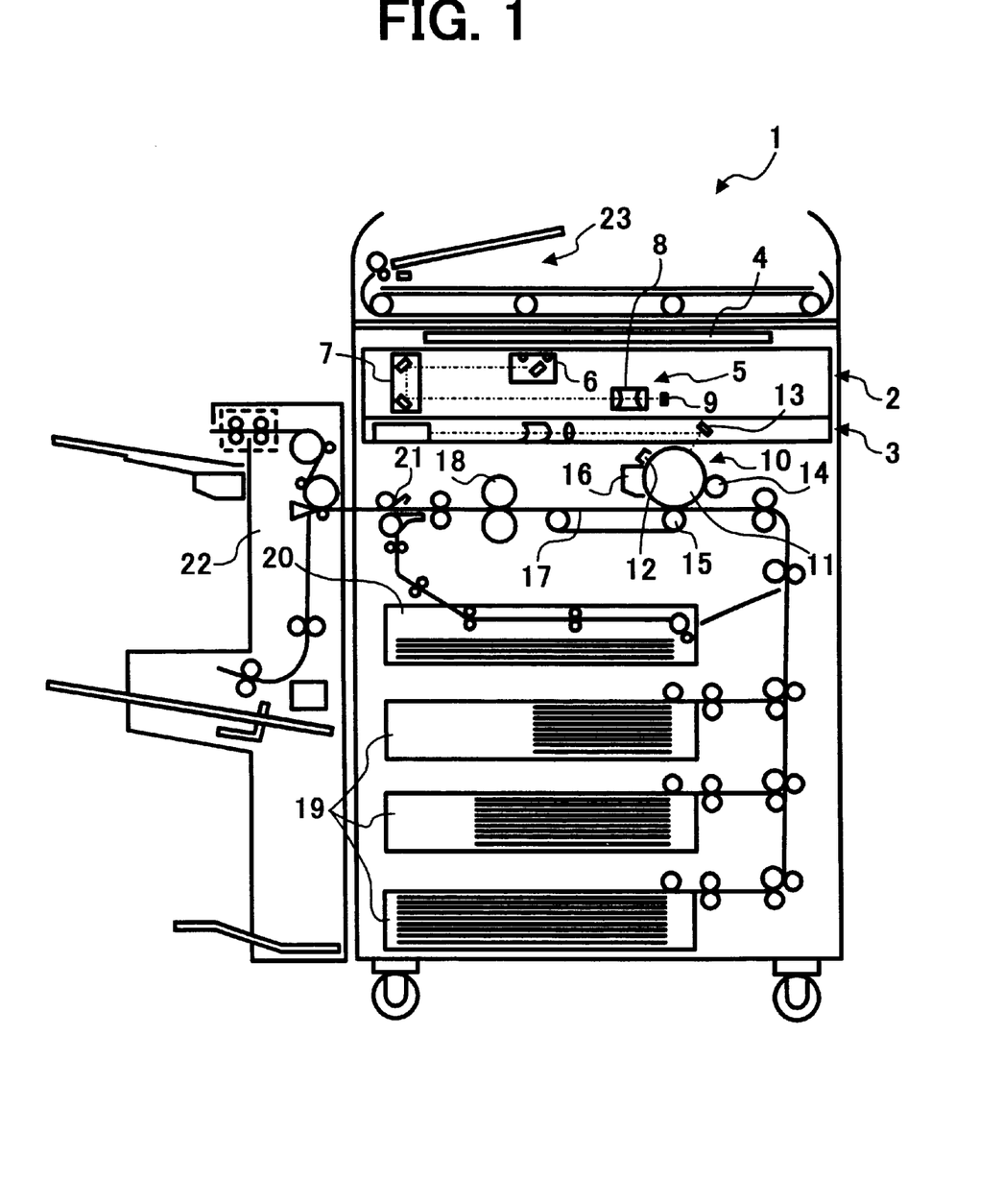
FIG. 1 is a vertical cross-sectional elevation illustrating an internal structure of a digital image forming apparatus according to the present invention.

An embodiment of the present invention is now explained referring to FIGS. 1 through 7. An image forming apparatus of the present invention can take the form of a digital copying machine 1 which includes a function of a printing apparatus for printing image data received from an external device (external source). As illustrated in FIG. 1, the digital copying machine 1 includes a reading unit (an image reading device) 2 and an image forming unit 3 as main units.

The reading unit 2 optically reads an original document (not shown) which is placed on a contact glass 4 with a scanning optical system 5. The scanning optical system 5 includes a first carriage 6 which includes an exposure lamp and a reflection mirror being held for movement in a sub-scanning direction and disposed at a position facing the contact glass 4. The scanning optical system 5 also includes a second carriage 7 which includes a plurality of mirrors also being held for movement in the sub-scanning direction and disposed at a position facing the first carriage 6, and a CCD (Charge Coupled Device) image sensor 9 positioned facing the second carriage 7 via an imaging lens 8, and the like.

In addition, the first carriage 6 and the second carriage 7 are connected to a stepping motor (not shown) with a pulley, a wire, or the like, and are held for movement in a sub-scanning direction at a speed ratio of two to one.

Next, the image forming unit 3 is explained. The image forming unit 3 prints image data received from the reading unit 2 to printing paper (not shown). The image forming unit 3 is provided with an electrophotographic mechanism 10 that includes a drum shaped photoconductive element 11. The electrophotographic mechanism 10 includes an optical writing unit 13 that forms a latent image on the photoconductive element 11, a charger 12, a laser output unit, an imaging lens, a mirror, or the like, a developing unit 14, a transfer device 15, and a toner cleaner 16, or the like. These elements are disposed around the photoconductive element 11 in order of electrophotographic processes. The photoconductive element 11 and a fixing unit 18 are provided along a paper conveying path 17.

At an upstream position of a paper conveying part that communicates with the paper conveying path 17, a plurality of paper feeding mechanisms 19 are provided that feed printing paper to the image forming unit 3. The plurality of paper feeding mechanisms 19 separately stack printing paper, each of which may be of a different size and/or setting direction.

Further, a duplex paper feeding unit 20 is provided at the upper part of the paper feeding mechanisms 19 so that an image can be printed on both sides of the printing paper. The paper re-feeding side of the duplex paper feeding unit 20 communicates with the paper conveying path 17. A paper discharge mechanism 21 is disposed at a position downstream of the paper conveying part that is communicating with the paper conveying path 17.

Furthermore, an automatic document feeder (ADF) 23 that automatically conveys a document to the reading unit 2 is mounted on an upper part of the digital copying machine 1, and an operation panel P (see FIG. 2) as an input operation section is disposed at a front position of an upper surface of the digital copying machine 1.

Figure 2:
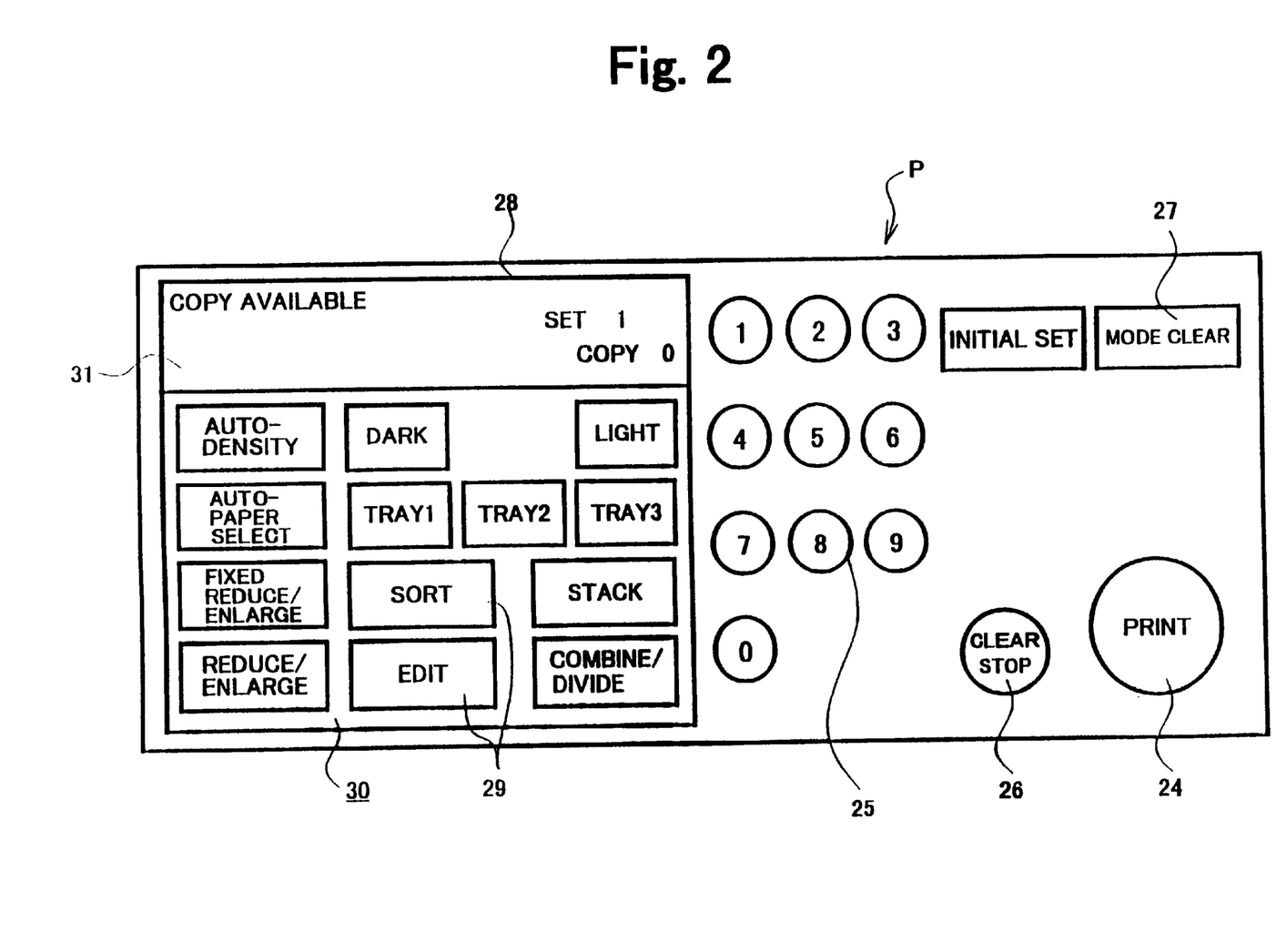
FIG. 2 is a plan view illustrating an operation panel of the digital image forming apparatus of FIG. 1, displaying an initial screen image.

As shown in FIG. 2, the operation panel P includes input keys, such as a print key 24 that makes a copy start trigger signal, a ten-key pad 25 to input numerals, a clear/stop key 26 to initialize data and to stop a copying operation, a mode-clear key 27 to change an operation mode, and the like. The operation panel P further includes an LCD (Liquid Crystal Display) touch panel 28. The LCD touch panel 28 includes an input operation section 30 provided with function keys 29 that appropriately appear at each screen image of operation stages. The LCD touch panel 28 also includes a display section 31 that displays a message containing, e.g., the number of output printed papers, a state of the digital copying machine, or the like. The LCD touch panel 28 can display a setting image of each of the selected function keys 29 when pressing down function keys 29, and the LCD touch panel 28 can graphically indicate a selected function by inverting a corresponding key to black.

Figure 3:
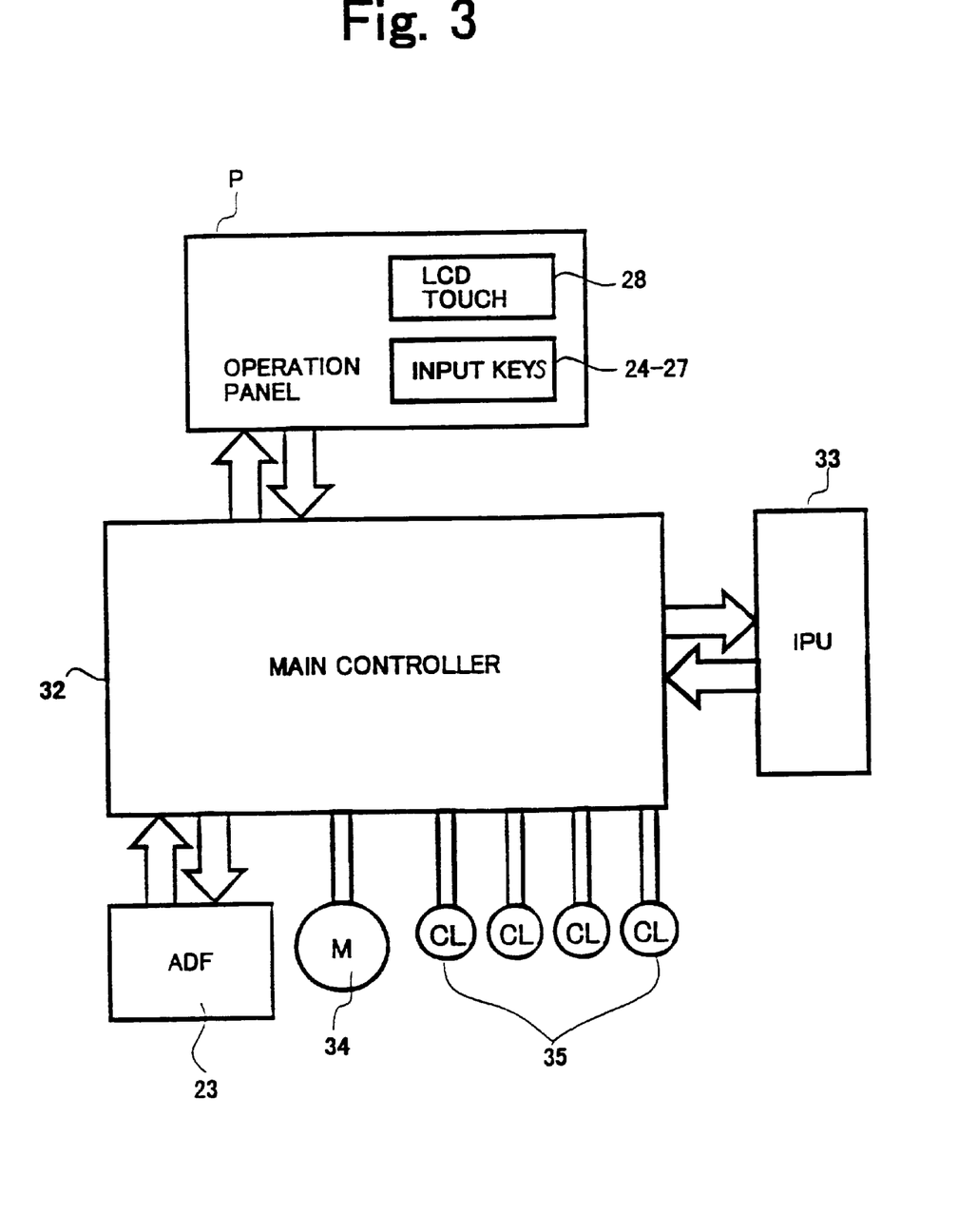
FIG. 3 is a block diagram illustrating a hardware construction of an electric control system of the digital image forming apparatus of FIG. 1.

Next, a hardware construction of an electric control system is described referring to FIG. 3. As shown in FIG. 3, a built-in main controller 32 that controls the entire digital copying machine 1 is provided therein. The main controller 32, which includes a CPU, a ROM, a RAM, and the like (all not shown), is connected with the operation panel P, the ADF 23, an IPU (image processing unit) 33, and the like, by a bus. The operation panel P, the ADF 23, and the IPU 33 exchange information on a state of the machine, an instruction of an operation, and the like, with the main controller 32, if necessary.

Further, a main motor 34 is connected to the main controller 32. The photoconductive element 11, the developing device 14, the transfer device 15, the fixing unit 18, the paper feeding mechanisms 19, the duplex paper feeding unit 20, the paper discharging mechanism 21, a post processing unit 22, the ADF 23, and the like, are driven by the main motor 34, directly or via clutches 35.

Figure 4:
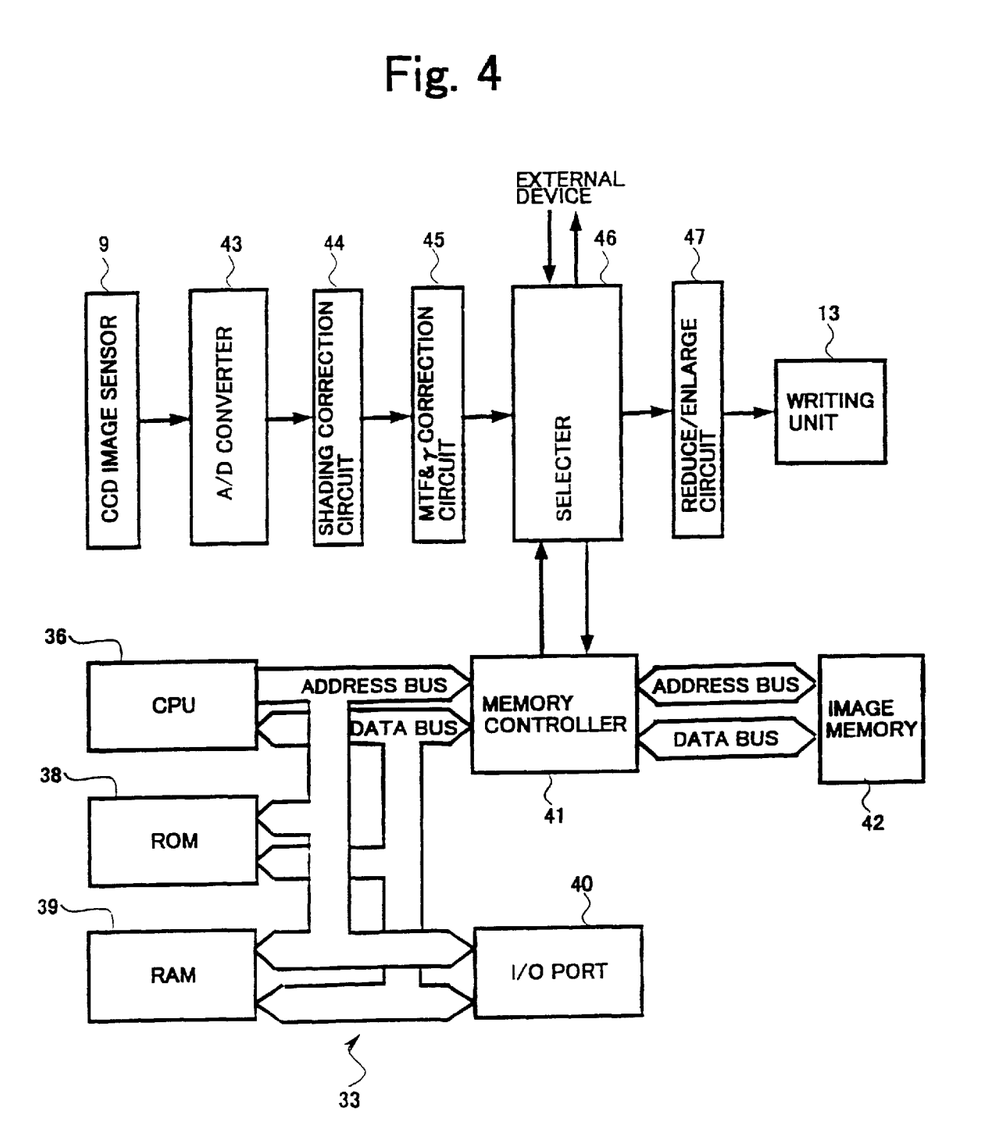
FIG. 4 is a block diagram illustrating an internal structure of an IPU of FIG. 3.

FIG. 4 shows the IPU 33, and as shown in FIG. 4, the IPU 33 includes a CPU (Central Processing Unit) 36 that performs a control operation of the image data of the aforementioned reading unit 2 and the image forming unit 3 provided therein. The IPU 33 includes a ROM 38 in which a control program and the like are stored, a RAM 39 that functions as a work area in which each kind of data is stored, and an I/O port 40, all of which are connected to the CPU 36 via an address bus, a data bus, and the like. A memory controller 41 is also connected to the CPU 36 via the address bus, the data bus, and the like. The CPU 36 performs writing of image data to an image memory 42 and reading of image data from the image memory 42 via the memory controller 41.

An A/D converter 43, a shading correction circuit 44, a MTF & γ correction circuit 45, a selector 46, and a reduction and enlarge circuit 47 are connected in this order between the CCD image sensor 9 in the reading unit 2 and the optical writing unit 13.

Thereby, image information of an original document read by the CCD sensor 9 with a photoelectric conversion is converted to a digital signal by A/D converter 43. Thereafter, the digital signal is input to the selector 46 after being processed with a shading correction at the shading correction circuit 44, and after a process of MTF and γ correction at the MTF & γ correction circuit 45. The selector 46 selects the device to which the image data is to be transmitted from among the reduction and enlargement circuit 47, the memory controller 41, and an external device.

When the reduction and enlargement circuit 47 is selected by the selector 46, a reduction and enlargement operation for the image data is processed at the reduction and enlargement circuit 47 according to a reduction and enlargement rate. Thereafter, the image data is output to the optical writing unit 13 and is provided for an actual writing to the photoconductive element 11. Further, the image data can be exchanged bidirectionally between the memory controller 41 and the selector 46, and bidirectionally between the external device and the selector 46.

Figure 5:
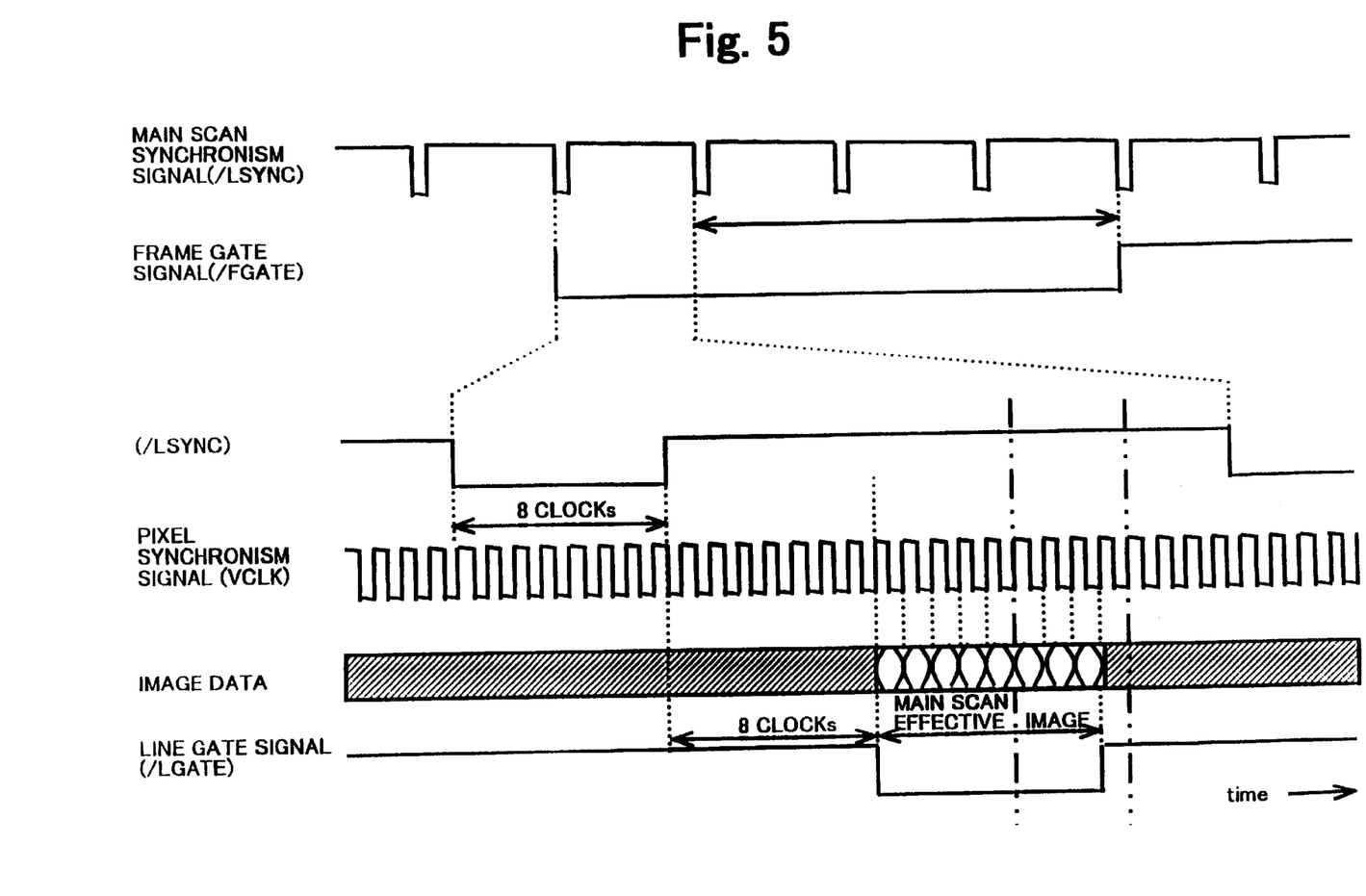
FIG. 5 is a timing chart showing an image signal of image data for one page at a selector.

Next, the image data for one page at the selector 46 is described referring to FIG. 5. As shown in FIG. 5, a frame gate signal (/FGATE) represents an effective time period for one page in a sub-scanning direction, and a main-scanning synchronizing signal (/LSYNC) is a synchronous signal for each one line. The image data becomes effective after a certain number of clock signals (eight clock signals in the example shown in FIG. 5) after the main-scanning synchronizing signal has risen up. A line gate signal (/LGATE) indicates that the image data in the main-scanning direction is effective. The signals are synchronized with a pixel synchronous signal (VCLK), and the image data of one pixel of eight bits to one cycle of the pixel synchronous signal is output. Further, the IPU 33 includes separate generation mechanisms for the frame gate signal (/FGATE), the main-scanning synchronous signal (/LSYNC), the line gate signal (/LGATE), and the pixel synchronous signal (VCLK) for each of the input and output of the image data, respectively. When directly outputting the image data to the optical writing unit 13, the IPU 33 enables a simultaneous input and output operation of the various image data to be performed, by executing a phase arrangement or the like. Namely, a plurality of image data, each of which is generated by separate functions, are simultaneously input and output from the selector 46.

Figure 6:
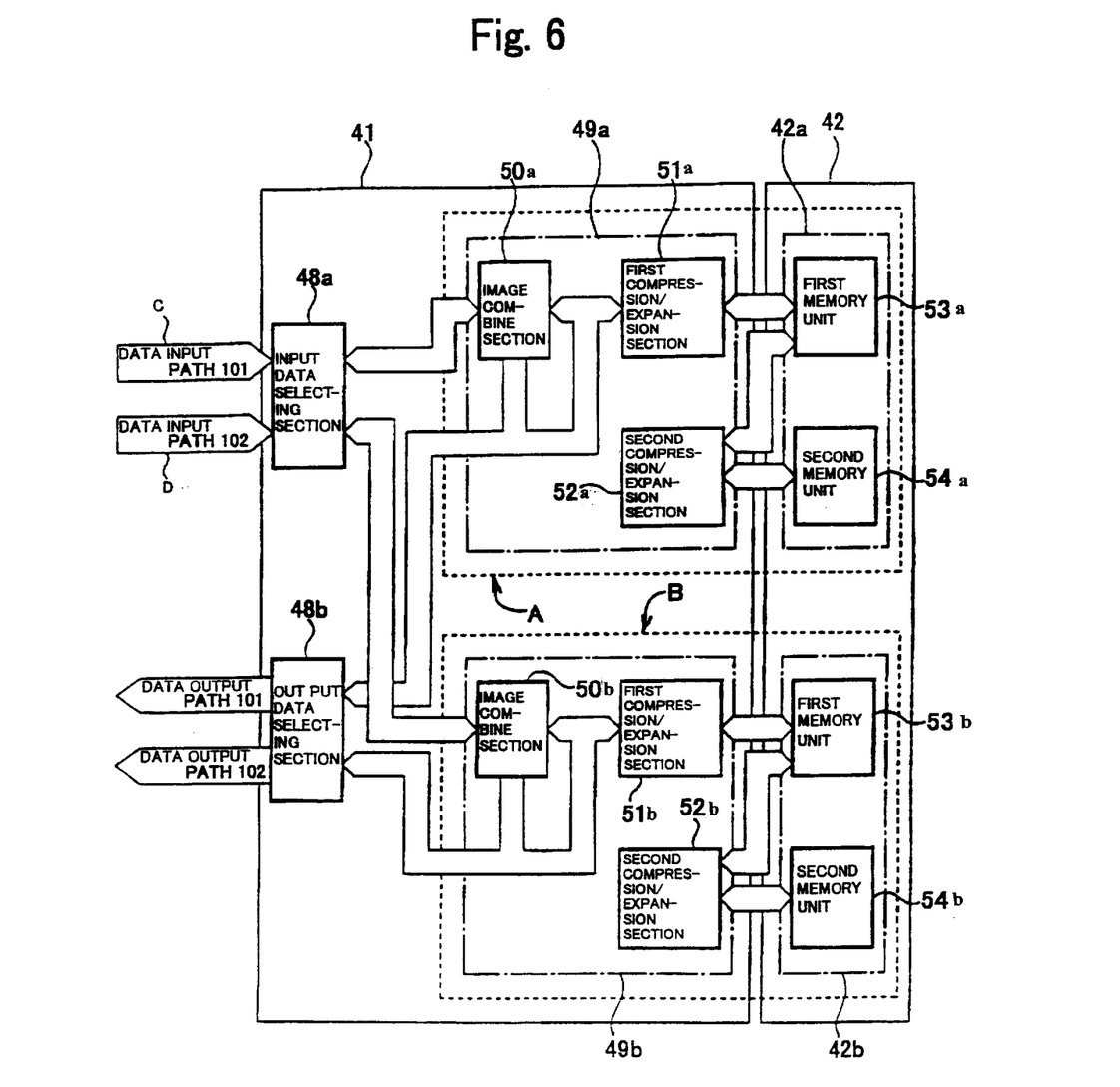
FIG. 6 is a block diagram illustrating internal structures of a memory controller and an image memory of the IPU in FIG. 4.

An internal structure of the memory controller 41 and the image memory 42 is illustrated in FIG. 6. As shown in FIG. 6, the memory controller 41 includes an input data selecting section 48a, an output data selecting section 48b, a first data input-and-output controller 49a, and a second data input-and-output controller 49b.

The memory controller 41 is configured to enable an input operation of the image data from two path systems (a data input path 101 C and a data input path 102 D) to the data selecting section 48a. That is, one data input path is prepared for the image data generated through the CCD image sensor 9 or the like, and another data input path is prepared for the image data generated by the external device. The input data selecting section 48a can select the input or output path, among four input paths and two output paths, since there are two input paths as mentioned above, and two input-and-output paths, i.e., one bidirectional input-and-output path for the image data between the input data selecting section 48a and the first data input-and-output controller 49a, and another bidirectional input-and-output path for the image data between the input data selecting section 48a and the second data input-and-output controller 49b.

Furthermore, the output data selecting section 48b can output image data to two path systems (a data output path 101 and a data path 102). Therefore, the output data selecting section 48b can select the input path or the output path for the image data, out of two input paths and two output paths, including the input paths for the image data from the first data input-and-output controller 49a and the second data input-and-output controller 49b.

The first data input-and-output controller 49a includes an image combine section 50a, a first compression-and-expansion section 51a, and a second compression-and-expansion section 52a. In addition, the second data input-and-output controller 49b has the same internal structure as that of the first data input-and-output controller 49a, and has the same function as that of the first data input-and-output controller 49a. Therefore, its redundant explanation is omitted.

Furthermore, the image memory 42 includes a first image memory 42a and a second image memory 42b. The first image memory 42a includes a first memory unit 53a and a second memory unit 54a. The first memory unit 53a may take the form of a DRAM so that an operation of writing the image data or an operation of reading the image data can be performed approximately synchronized with the data rate of the image data. Furthermore, since the first memory unit 53a includes a plurality of memory areas (not shown) and an interface that enables the first memory unit 53a to input and output the image data of two path systems, the input-and-output operation of a plurality of image data can simultaneously be performed. The second memory unit 54a may take the form of a HDD (Hard Disk Drive) so that a storing operation of a large amount of the data can be performed. Further, since the internal structure of the second image memory 42b is configured to be the same as that of the first image memory 42a, and since its function is also the same, its redundant explanation is omitted.

A memory device A includes the first data input-and-output controller 49a and the first image memory 42a, and a memory device B includes the second data input-and-output controller 49b and the second image memory 42b.

The CPU 36 of the IPU 33 performs each kind of process and control according to a control program stored in the ROM 38. The present invention provides a function of an image memory switching device as a function of the predetermined process and control performed by the CPU 36 of the IPU 33. The image memory switching device performs a function of switching a plurality of image data (2 kinds of the image data, in this embodiment) output from the selector 46 to the image memories, i.e., the input data selecting section 48a selects and directs the image data input from the data input path 101 C to the memory device A, and the image data input from the data input path 102 D to the memory device B.

The image data input through the input data selecting section 48a is switched to either the memory device A or the memory device B, each in the memory controller 41, and is processed. A data flow of the image data in the memory device A is hereinbelow described as an example. First, the image data input through the input data selecting section 48a is provided to the image combine section 50a. The image data is combined with data which is already written and stored in the image memory 42, at the image combine section 50a. The image data processed at the image combine section 50a is compressed at the first compression-and-expansion section 51a, and then the compressed image data is written and stored in the first memory unit 53a. The image data written in the first memory unit 53a is further compressed at the second compression-and-expansion section 52a, prorata. The compressed image data is then written and stored in the second memory unit 54a.

When the CPU 36 judges that the image data to be output at a time of outputting the image data is stored in the first memory unit 53a, the image data is expanded at the first compression-and-expansion section 51a. In addition, the image data expanded at the first compression-and-expansion section 51a or the image data expanded at the image combine section 50a can be combined with further data, and is then output. Further, the image combine section 50a performs processes, such as a combination of the image data stored in the first memory unit 53a and input data (the image combine section 50a includes a phase arrangement function for the image data), a selection of the device to which the image data is to be output to after the image data is combined (outputting image data, writing back to the first memory unit 53a, or both of outputting image data and writing back to the first memory unit 53a), and the like.

Further, when the CPU 36 judges that the image data to be output is not stored in the first memory unit 53a, the image data to be output stored in the second memory unit 54a is expanded at the second compression-and-expansion section 52a, and the expanded image data is then written in the first memory unit 53a. Thereafter, the aforementioned image output operation of outputting image data from the first memory unit 53a is performed.

Furthermore, since both of the image data output from the first image memory 42a and the second image memory 42b are input to the input data selecting section 48a, the first image memory 42a and the second image memory 42b are configured so that an exchange of the image data can be performed.

A case in which two kinds of image data generated by separate functions are generated at the same time according to simultaneously performing both of an electronic sort process and a printing process on the basis of an instruction of an external device is described hereinbelow.

The digital copying machine 1 in the present invention is set to a state which is capable of performing an electronic sort process by operating a "sort" key which is one of the function keys 29 on the LCD touch panel 28 in the operation panel P, for example. The electronic sort process is started by setting a bundle of required original documents (not shown) on the ADF 23, setting a number of a bundle of papers to be output by an operation of the ten-key pad on the operation panel P, and operating the print key 24 on the operation panel P.

When the print key is operated, an original document is conveyed starting from a lowermost part of the bundle of original documents in the order they are stacked on the contact glass 4 one after another. An image of the original document mounted on the contact glass 4 is read by scanning utilizing the first carriage 6 and the second carriage 7. The image of the original document is then imaged on the CCD image sensor 9, through the imaging lens 8, and image data is generated according to the image being processed through the A/D converter 43, the shading correction circuit 44, and the MTF & γ correction circuit 45. The thus generated image data is input to the selector 46. Hereupon, a function of the image reading device is performed. The process is repeated until the ADF 23 runs out of original documents stacked thereon. Further, image data generated and transmitted from an external device is input to the selector 46 in parallel with the image data from the print operation. A function of a data input device is thus performed.

Figure 7:
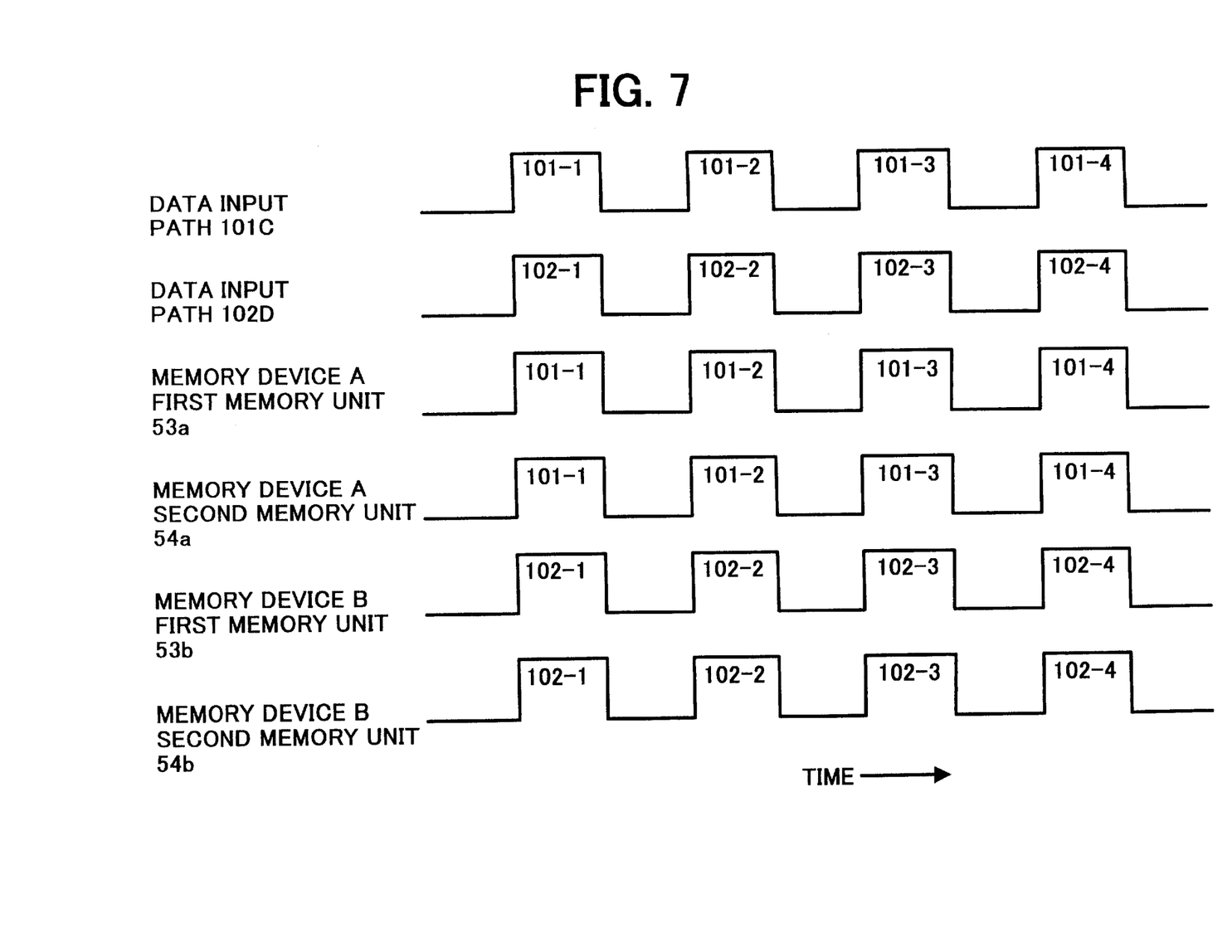
FIG. 7 is a timing chart showing a state of simultaneously storing a plurality of image data, each of which is generated by separate functions, in the image memory of FIG. 6.

The image data simultaneously generated by the two kinds of separate functions is output to the memory controller 41 at random from the selector 46 to which the image data is thus input. As shown in FIG. 7, the image data input from the data input path 101 C to the input data selecting section 48a of the memory controller 41 and the image data input from the data input path 102 D to the input data selecting section 48a of the memory controller 41 are output to each of the memory devices A and B in a manner as described below by the image memory switching device. The image data input from the data input path 101 C is output to the memory device A starting from the first image data in order, and the image data input from the data input path 102 D is output to the memory device B starting from the first image data in order. The image memory switching device switches connection to either the memory device A or the memory device B in which the image data or the image data is to be stored.

The image data switched to be stored in either the memory device A or the memory device B is stored in the first memory unit 53a and the second memory unit 54a in the first image memory 42a or the second image memory 42b both in the image memory 42. The image data stored in the first image memory 42a and the image data stored in the second image memory 42b are output to the optical writing unit 13 in the image forming unit 3 after a predetermined process is performed by the memory controller 41.

Further, the printing paper fed from the plurality of paper feeding mechanisms 19 and the duplex paper feeding unit 20 is conveyed to the transfer device 15 through the paper conveying path 17. On the other hand, at a side of the photoconductive element 11, an electrostatic latent image is formed on the photoconductive element 11 by the laser beam irradiated from the optical writing unit 13, and a toner image is formed by a developing operation of the developing device 14. The printing paper conveyed to the position of the transfer device 15 is further conveyed at the same moving speed as a circumferential speed of the photoconductive element 11 adjusting a leading edge thereof to the tip end portion of the toner image.

The toner image is transferred to the printing paper at the transfer device 15. The fixing unit 18 fixes the toner image on the printing paper after the transfer operation. An image printing device thus functions. The printing paper is discharged by the drive of the paper discharging mechanism 21 after the fixing operation. The discharged printing paper may be conveyed through the post processing unit 22 according to the predetermined paper processing function, and is further discharged to a paper discharging tray or the like.

Furthermore, at a time of finishing a front face copying operation of a duplex copy, the printed paper is once discharged to the duplex paper feeding unit 20, and is then re-fed for a back face copy.

At this moment, even if the electronic sort process and the printing process on the basis of instructions from an external device are simultaneously performed, the image data relevant to the electronic sort and the image data relevant to the printing process are transmitted to either the memory device A or the memory device B switching the same by the image memory switching device. Thereafter, the image data is stored in the first image memory 42a in the memory device A, or the second image memory 42b in the memory device B, and then the image data is printed to the printing paper.

Thereby, even if the electronic sort process and the printing process on the basis of instructions from an external device are simultaneously performed, since the storing operation for each of the image data to the image memory is performed at a relatively high speed in parallel with each other, a process time is reduced and the image data is efficiently processed in comparison with an image data processing operation of a background digital copying machine.

Figure 8:
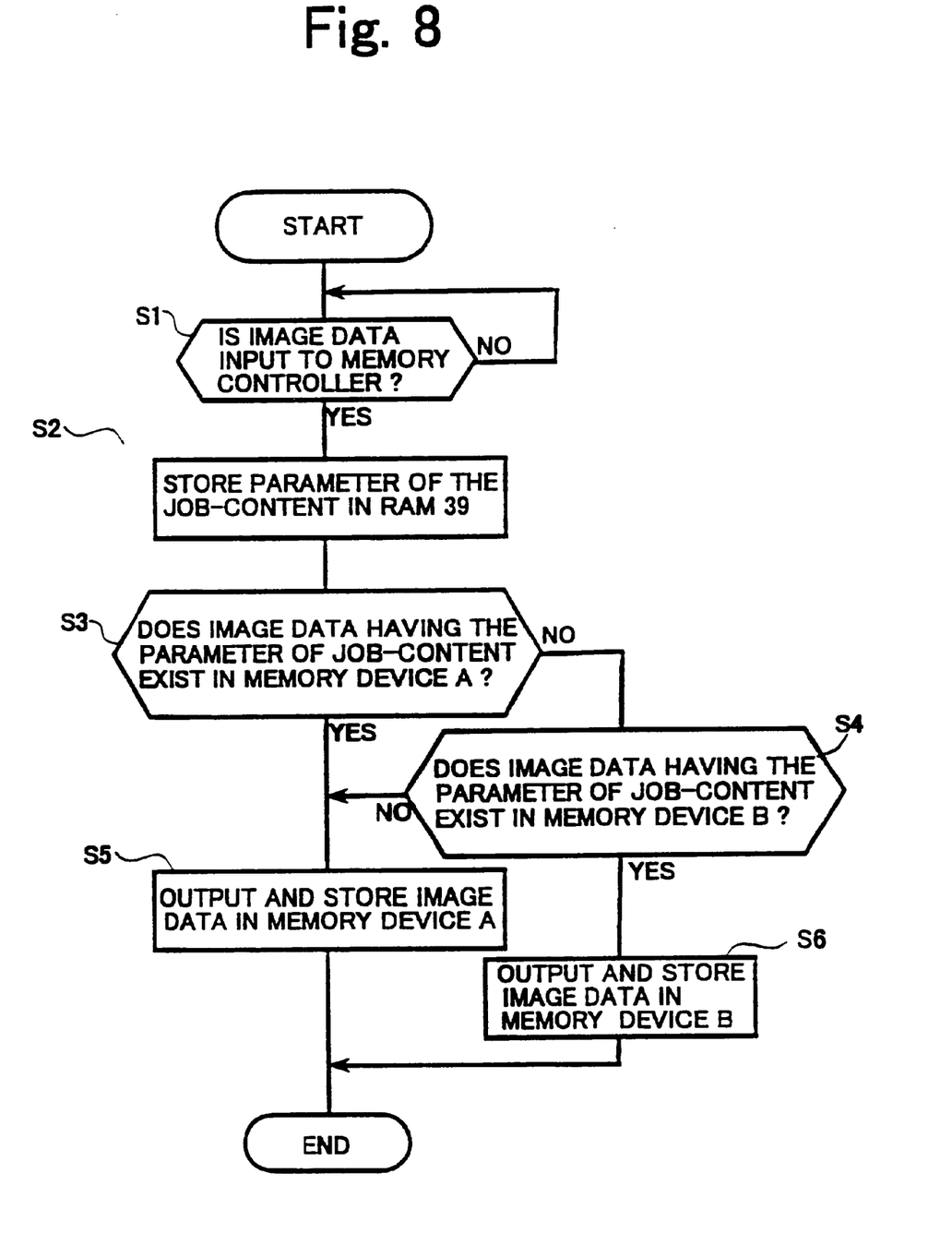
FIG. 8 is a flowchart illustrating a data switching procedure in a variation of the embodiment of the present invention.

Next, a variation of the above-discussed embodiment of the present invention is described referring to FIG. 8. The same reference numerals denote corresponding elements in FIGS. 1–7, and the same explanation is omitted. The digital copying machine 1 in the variation of the embodiment of FIG. 8 of the present invention has no structural difference from the previously described embodiment, and only a data selecting process performed by the CPU 36 in the IPU 33 at the input data selection section 48a is different. A flow of the data switching process is described referring to FIG. 8.

First, the CPU 36 waits until image data is judged to be input to the input data selecting section 48a of the memory controller 41 from the selector 46 in step S1. If the image data is judged to be input to the input data selecting section 48a of the memory controller 41 (i.e. Yes in step S1), a parameter that shows a job content of the image data stored in each of the memory units (the first memory units 53a, 53b and the second memory units 54a, 54b) in each of the memory devices (the memory devices A and B) is obtained for each memory device, and is temporarily stored in the RAM 39 (step S2).

The parameter that shows a job content of the image data is provided for distinguishing between, for example, image data generated through the CCD image sensor 9 at the electronic sort process and image data generated by an external device at the printing process.

Next, the CPU 36 judges whether image data that includes the same parameter as that which shows the job content of the image data input to the memory controller 41 from the selector 46 exists in the memory devices A or B, in steps S3 and S4. If the image data including the same parameter exists in the memory device A (i.e. Yes in step S3), or the image data including the same parameter does not exist in both of the memory devices A and B (i.e. No in step S4), the input image data is output to the memory device A, which is switched by the image memory switching device, and is stored therein (step S5). Further, if the image data including the same parameter exists in the memory device B (i.e. Yes in step S4), the input image data is output to the memory device B, which is switched by the image memory switching device, and the image data is stored therein (step S6).

The image data transmitted to the memory devices A or B is stored, respectively, in the first memory units 53a, 53b and the second memory units 54a, 54b, both in the first image memory 42a or the second image memory 42b in each of the memory devices A and B.

The image data stored in the first image memory 42a and the second image memory 42b in the image memory 42 is output to the optical writing unit 13 in the image forming unit 3 after being processed with the predetermined process at the memory controller 41. Thereafter, the image data is processed in a similar manner as performed in the above-discussed embodiment of the present invention.

When the image data including the same parameter as that which denotes each of the job content of the image data exists in either the memory device A or the memory device B, image data relevant to the electronic sort process or image data relevant to the printing process is switched to be transmitted to the memory device A or B, in which the image data of the same parameter is stored. Thereby, the image data generated by the same function is stored in the image memory of the same memory device. Thus, since the image data generated by the same function is stored in the same image memory, a data access efficiency in a case of calling the image data from the image memory is improved and a process efficiency for a multiple function is further improved.

Further, in each of the embodiments of the present invention, if the first memory units 53a, 53b are provided with sufficient memory capacity for performing the image data process, the input-and-output operation of the image data to the second memory units 54a, 54b need not be performed. In addition, if the second memory units 54a, 54b are configured so that the image data can be written and read approximately in synchronization with the data rate required at a time when the image data is input or output, the input or output image data can be directly written to the second memory units 54a, 54b or directly read from the second memory units 54a, 54b.

The controllers of this invention may be conveniently implemented using a conventional general purpose digital computer or microprocessor programmed according to the teachings of the present specification, as is apparent to those skilled in the computer technology. Appropriate software coding can readily be prepared by skilled programmers based on the teachings of the present disclosure, as is apparent to those skilled in the software art. The present invention may also be implemented by the preparation of application specific integrated circuits or by interconnecting an appropriate network of conventional component circuits, as is apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This document is based on Japanese patent application JPAP10-028955 filed on Feb. 10, 1998, the entire contents of which are hereby incorporated by reference.

What is claimed as new and desired to be secured by Letters Patent of the United States is:

1. An image forming apparatus, comprising:
    a plurality of memory devices, each respective memory device comprising:
        at least one image memory configured to store image data; and
        a dedicated controller allocated to said respective memory device and configured to control input and output operations for said image data to and from said at least one image memory;
    an image reading device configured to generate image data by reading an original document;
    at least one data input device configured to input image data generated by an external source;
    a plurality of input paths configured to transmit said image data generated by said image reading device and said image data input by said at least one data input device; and
    an image memory switching device configured to connect said plurality of input paths to said plurality of memory devices, to receive said image data generated by said image reading device and said image data input by said at least one data input device, and to switch said plurality of memory devices to transmit consecutive image data, which is consecutively sent through one of said plurality of input paths, to a same memory device among said plurality of memory devices when said image memory switching device receives said image data and said image data through said plurality of input paths.

2. The image forming apparatus according to claim 1, wherein said image memory switching device switches among said plurality of memory devices to transmit consecutive image data generated by a same function to a same memory device among said plurality of memory devices when said same memory device among said plurality of memory devices stores image data which is generated by the same function.

3. The image forming apparatus according to claim 1, further comprising an image printing device which prints an image on printing paper based on said image data stored in said image memory according to an electrophotographic process.

4. The image forming apparatus according to claim 1, wherein each memory device comprises first and second image memories.

5. The image forming apparatus according to claim 1, wherein the image reading device reads the original document by scanning the original document.

6. An image forming apparatus, comprising:

a plurality of memory means, each respective memory means comprising:
 at least one image memory means for storing image data; and
 dedicated control means allocated to said respective memory means for controlling input and output operations for said image data relative to said at least one image memory means;

image reading means for generating image data by reading an original document;

at least one data input means for inputting image data generated by an external source means;

a plurality of input path means for transmitting said image data generated by said image reading means and said image data input by said at least one data input means; and image memory switching means for connecting said plurality of input path means to said plurality of memory means, for receiving said image data generated by said image reading means and said image data input by said at least one data input means, and for switching said plurality of memory means to transmit consecutive image data, which is consecutively sent through one of said plurality of input path means, to a same memory means among said plurality of memory means when said image memory switching means receives said image data and said image data through said plurality of input path means.

7. The image forming apparatus according to claim 6, wherein said image memory switching means switches among said plurality of memory means to transmit consecutive image data generated by a same function to a same memory means among said plurality of memory means when said same memory means among said plurality of memory means stores image data which is generated by said same function.

8. The image forming apparatus according to claim 6, further comprising an image printing means for printing an image on printing paper based on said image data stored in said image memory according to an electrophotographic process.

9. The image forming apparatus according to claim 6, wherein each memory means comprises first and second image memories.

10. The image forming apparatus according to claim 6, wherein the image reading means reads the original document by scanning the original document.

* * * * *